United States Patent [19]

Isham

[11] Patent Number: 5,784,620
[45] Date of Patent: Jul. 21, 1998

[54] OBJECT-ORIENTED SYSTEM HAVING SHARED-PERSISTENT CLASS PATTERN

[75] Inventor: Karl Michael Isham, Salt Lake City, Utah

[73] Assignee: Philips Electronics North America Corp., New York, N.Y.

[21] Appl. No.: 559,788

[22] Filed: Nov. 15, 1995

[51] Int. Cl.$^6$ ............................................. G06F 9/44
[52] U.S. Cl. ............................... 395/683; 395/682
[58] Field of Search ..................... 364/148, 180, 364/184; 395/608, 609, 614, 683, 685, 682

[56] References Cited

U.S. PATENT DOCUMENTS

| | | | |
|---|---|---|---|
| 5,241,624 | 8/1993 | Torres | 395/614 X |
| 5,291,593 | 3/1994 | Abraham et al. | 395/614 |
| 5,455,951 | 10/1995 | Bolton et al. | 395/682 |
| 5,465,362 | 11/1995 | Orton et al. | |
| 5,504,892 | 4/1996 | Atsatt et al. | 395/614 |

OTHER PUBLICATIONS

Booch, *Object Oriented Design with Applications*, The Benjamin/Cummings Publishing Company, Inc., pp. 36-37 and 45-46. (1993).

Rumbaugh et al., *Object-Oriented Modeling and Design*, Prentice Hall, pp. 2-3 and 36-41. (1991).

*Primary Examiner*—Tan Q. Nguyen
*Assistant Examiner*—Edward Pipala
*Attorney, Agent, or Firm*—Michael E. Belk

[57] ABSTRACT

An object-oriented system includes a base class and a related derived class. A state selector class provides state selection to the base class. A class of operational objects are related to the base class through aggregation. Each operational object includes an internal object having a pair of internal states and a selector operative therebetween which responds to the derived class.

12 Claims, 3 Drawing Sheets

OBJECT-ORIENTED SYSTEM HAVING SHARED-PERSISTENT CLASS PATTERN

SPECIFICATION

1. Field of the Invention

This invention relates generally to object-oriented programming and object-oriented software systems and particularly to providing improved control over encapsulated data within system objects.

2. Background of the Invention

Object-oriented programming and systems differ from the more conventional software systems in that the system is formed using a plurality of software objects as the fundamental logical building blocks of the system rather than the data flow and algorithm relationships of more conventional programming. Object-oriented systems are described and taught in numerous publicly available textbooks such as object oriented Design with applications written by Grady Booch and published by the Benjamin/Cummings Publishing Company, Inc. ISBN-0-8053-0091-0 and object oriented Modeling and Design by James Rumbaugh published by Prentice Hall, ISBN number 0136298419.

As described in the above literature, object-oriented programming is generally defined as a method of implementation in which programs are organized as cooperative collections of objects, each of which represent an instance of some class, and whose classes may be members of a hierarchy of classes united via inheritance relationships. The language of object-oriented programming may be generally described as a language which supports objects that are abstractions with an interface of named operations and a hidden local state. The objects have an associated type or class and the types or classes may inherit attributes from super types or super classes.

Each object within an object-oriented system possesses or is defined by an interface and an implementation. Basically, the interface relates to the objects outside view encompassing the abstraction of the behavior of the object. In contrast, the implementation represents the abstraction as well as the mechanisms within the object which achieve the desired behavior. In essence, the interface expresses a specification of the function of the object. The implementation is the collection of detailed information within the object necessary to carry out its behavior which is in fact hidden from other objects and the remainder of the system.

In accordance with a major operating parameter of object-oriented systems, the implementation of an object is hidden from other objects or subsystems within the remainder of the system in accordance with a principle known generally as encapsulation or information hiding. This principle of encapsulation is fundamental to object-oriented systems and facilitates the ease with which program changes may be made reliably with a limited effort. The principle of encapsulation also prevents contamination of data within an object during interaction with the remainder of the system since its data is not directly accessible.

In essence, an object is known by the remainder of the system by the function or operation which it performs. For example, a typical object within an object-oriented system may be required to provide a numeric count of certain activities (in other words operate as a counter). Providing this numeric count is, in essence, the definition of the object to systems outside the object. As a result, providing the numeric count encompasses the abstraction of the object's behavior. The functional operations which would typically be permitted to such an object might include functions of reading the number, observing resetting the number, incrementing the number, or decrementing the number. Objects within the system may be allowed to do some or all of the above functions. However, the object's implementation, that is how it represents the count in memory, how its range is limited, and the exact means to manipulate the count, would be internal and in accordance with the principle of encapsulation would not be accessible to other objects. As a result, in this example no object within the system could access the implementation of the numeric count object, that is the mechanism doing the count, and introduce error or contamination by loading in a new or different number.

Objects within object-oriented systems are also defined in terms of three qualities which they possess. These qualities are behavior, state and identity is how an object acts and reacts. Behavior is how an object acts and reacts also describes the operations which the object is able to perform upon the data within its internal state. Thus, the state of an object encompasses all of the properties of the object plus the current values of each of these properties. The identity of the object is unique to the object and is that property which distinguishes it from all other objects of the same class or type. It corresponds in reality to its allocated location within memory.

In terms of the logical building block arrangement of object oriented systems, objects exist within an object-oriented system in accordance with an architecture defined by combinations of classes and subclasses. In essence, a class is defined as a type of object. In the example set forth above, the object which provides a numeric count is an instance of a class which may be described as a counter. In the event the system has other objects which are counters, these objects would belong to the same class as the object described above but would have a different identify, meaning that they may have different current values for count, but will all behave similarly. Subclasses exist within classes of objects and inherit the properties or functions of the class they are derived from. Thus, in a typical object-oriented system, there exist objects which are of a class and/or subclass and which are fitted within an inheritance hierarchy due to the class and subclass relationships within the system. By way of analogy, the relationships of objects within the hierarchy and classes and subclasses within an object-oriented system corresponds generally to hierarchy described by generic terms having tiers of species and subspecies in their classification.

Object-oriented systems provide substantial advantages in programming and structuring complex systems in that the emphasis is shifted from programming methods which focus primarily on the proper and effective use of a particular language mechanism to design methods which emphasize the proper and effective structuring of a complex system. The design process in an object-oriented design encompasses the process of interrelating the functionally defined objects within the system. In essence, object-oriented analysis and design emphasizes the building of "real world models" using an object-oriented view of the system. The encapsulation of the internal workings of each object simplifies the interactive operations of the objects within the system. In essence, objects at higher levels of abstraction are shielded from lower level implementation details. Objects are thought of as mechanisms to achieve a desired behavior allowing each object to be solely concerned with the external qualities or interface of other objects. This encapsulation not only facilitates ease of design but allows each object to protect its internal state and its internal mechanisms and data for achieving its particular behavior or implementation.

Despite the very substantial advantages provided by object-oriented systems particularly in complex environments, the need to preserve and maintain encapsulation within the objects imposes significant limitations upon the system operation. For example, maintenance of encapsulation which is critical to object-oriented design, becomes a barrier to the system's ability to manipulate the internal states of all objects in the system as a whole to perform certain functions. Among these functions are the preservation or maintenance of internal states during periods of time when the system is shut down. In addition, similar problems are encountered when the system requires the maintenance of multiple copies of the internal states of a collection of certain objects. A system requirement may arise in which the internal states of a collection of certain objects must be capable of being switched on command by a system operator. Since in accordance with the above it is clear that objects normally encapsulate their internal states, they are inaccessible to other objects directly and impossible to save externally. It is equally clear that exposing the internal states of such objects violates the major principle of encapsulation and compromises the system. There remains, therefore, a need in the art for an object-oriented system which maintains encapsulation and the benefits thereof while providing sufficient collective access to object internal states to facilitate further flexibility of system operation.

SUMMARY OF THE INVENTION

Accordingly, it is a general object of the present invention to provide an improved object-oriented system. It is a more particular object of the present invention to provide an improved object-oriented system which maintains object internal state encapsulation while providing collective access to internal state data of system objects. It is a still more particular object of the present invention to provide an improved object oriented system which provides data persistence and single point state management and concurrency to facilitate operations such as simplified control and internal state switching.

The present invention overcomes the above-described limitations of object-oriented systems by providing a shared-persistent class pattern which operates without violating encapsulation to provide persistence as well as the ability to manage system state sets through a single interface. The class pattern specifies an object interaction consisting of an inheritance hierarchy. System objects can create instances of the subclasses in the hierarchy and use them in place of their internal state. The base class (or super class) establishes a common structure and abstracts common behavior for each subclass, implements and hides the persistence scheme, and provides an interface to allow for control over system wide state selection. Each subclass collects all data needed by a system object "owner" into a single data segment and provides public observers (or get operations) and private mutators (or set operations) for each of the data members in the segment. The system object owner is given access to the private mutators of the subclass, and therefore has the ability to change its data. All other system objects are forced to use the subclass data members only through their public read-only observation functions.

In accordance with the present invention, there is provided an object-oriented system comprising: a plurality of classes each having an internal object defining a plurality of internal states and means for switching therebetween; a base class and a state selection class related to provide a state selection command to the base class; and a derived classes related to the base class through a hierarchy of inheritance in which the derived class may be controlled by the base class, the base class operative in response to the state selection class to the internal states of the internal objects on a system-wide basis in accordance with a shared-persistent object-oriented class pattern.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
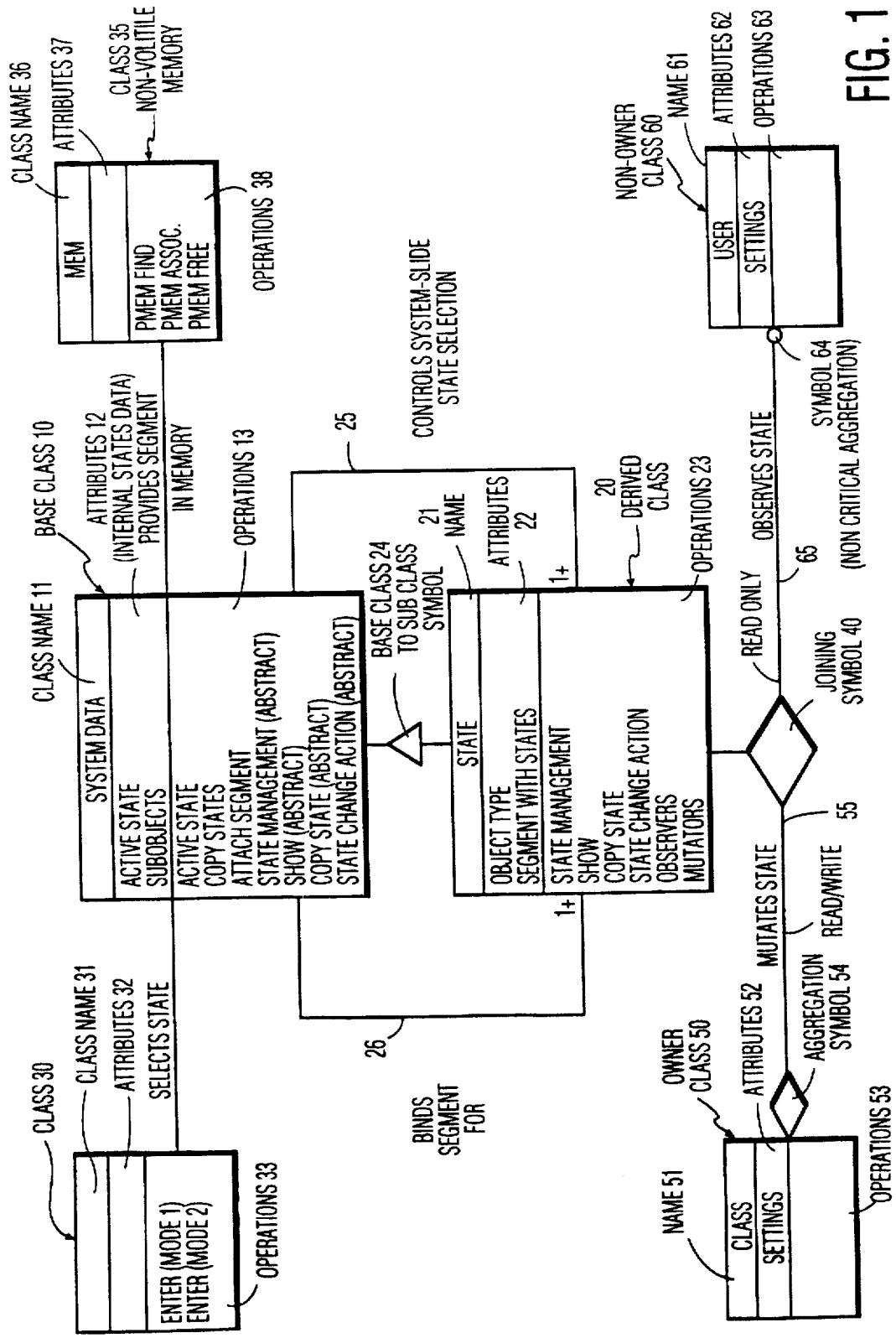
FIG. 1 sets forth a diagram of a generalized embodiment of the present invention system in Rumbaugh notation.

FIG. 1 sets forth a diagram of a generalized embodiment of the present invention object-oriented system set forth in Rumbaugh notation. Rumbaugh notation is set forth in the above text written by Rumbaugh and is a generally recognized standard system of notation for diagramming object-oriented software systems. In the general pattern of Rumbaugh notation with which FIG. 1 is consistent, the elements therein include rectangles which denote classes of which form objects and which are divided into three portions including a class name, a number of class attributes and a number of operations performed by objects within the class. The connecting lines between the class rectangles in Rumbaugh notation are indicative of a relationship existing between the connected classes. These notations without any additional symbols denote an association, or relation, between the connected classes, of a type which is named by the test which accompanies the line. In addition, a number of symbols are provided which do of themselves indicate the nature of relationship between connected classes in such a way that one class is contaminated with the other. These symbols include a base class to derived class symbol comprising a triangle such as symbol 24 as well as a diamond symbol such as symbol 40 indicating a joining of relationships, as well as a small diamond adjacent the class rectangle such as symbol 54 which indicate aggregation or combination of classes. In addition, a circular symbol such as symbol 64 adjacent a class is indicative of an association with a multiplicity of zero or one. Multiplicity is that which specifies how many instances of one class may relate to a single instance of an associated class. A symbol such as symbol 66 indicates a multiplicity of one or more classes in relation to the other class connected by the association line.

With specific reference to the system of FIG. 1, the system in accordance with the present invention includes a base class 10 having a class name 11 system data and a plurality of attributes 12 together with operations 13. Attributes 12 indicate the internal state data of base class 10 while operations 13 indicates the various functions which base class 10 is able to perform upon data within the class objects. In addition, operations portion 13 of base class 10 indicates several abstract functions such as state management {abstract}. Similar abstract operations are indicated in operations portion 13 such as show, copy state, and state change action all of which include abstract indicia. The meaning of such abstract notations within operations portion 13 of base class 10 is to provide a pattern or template for classes derived from the base class. In terms of the effect upon other classes derived from base class 10, such abstract notation imposes a requirement that each class derived from the base class must have these operations within it. That is, they must implement these operations with the interface which is specified by the base class. As will be seen below, the operations abstracted in base class 10 of state management, show, copy state, and state change action are all found within derived class 20 within operations portion 23. In addition, a base class symbol 24 is shown coupled between base class 10 and derived class 20. The meaning of base class symbol 24 is to denote the inheritance relationship between base class 10 and derived class 20. Derived class 20 includes a class name 21 which is shown to be "state", a set of attributes 22 and a set of operations 23. As mentioned previously, operations 23 of derived class 20 are abstracted in operations portion 13 of base class 10 consistent with the base/derived class relationship between classes 10 and 20. In addition, an association line 25 and an association line 26 are shown between base class 10 and derived class 20. These relationships are indicative of operational relationships between base class 10 and derived class 20. In the example selected in FIG. 1, association line 25 indicates an association in which base class 10 is able to control system-wide data state selection. Association line 26 indicates a relationship in which the system data class of base class 10 functions to provide memory segment availability for derived class 20 with the added cooperation of class 36.

FIG. 1 also shows a class 30 having a class name 31 of Mode Selector, a set of attributes 32 which are unlisted and an operations set 33. An association 34 extends between class 30 and base class 10. Similarly, a class 35 includes a class name 36, a set of attributes 37 which are unlisted and an operations portion 38. An association 39 extends between class 35 and base class 10.

An owner class 50 includes a class name 51, a set of attributes 52 and an operations portion 53. Owner class 50 is shown related to derived class 20 through a joining symbol 40 and an aggregation symbol 54 through an association line 55. Joining symbol 40 indicates a simple combining of relationships while aggregation symbol 54 indicates a relationship between objects of class 50 and derived class 20 in 55 is a read/write relationship between classes 20 and 50.

Class 60 is a class type referred to in terms of the invention as "non owner" in that the association indicated by symbol 64 between class 60 and derived class 20 is optional and as indicated by the observed state notation on association line 65, class 60 may contain a class 20, but the operations in class 60 can only read the internal state of class 20 by application of class 20 observers. In essence then, association line 65 is a read-only relationship between classes 20 and 60. Class 60 includes a name 61, a set of attributes 62 and a set of operations 63 which is shown in blank.

Figure 3:
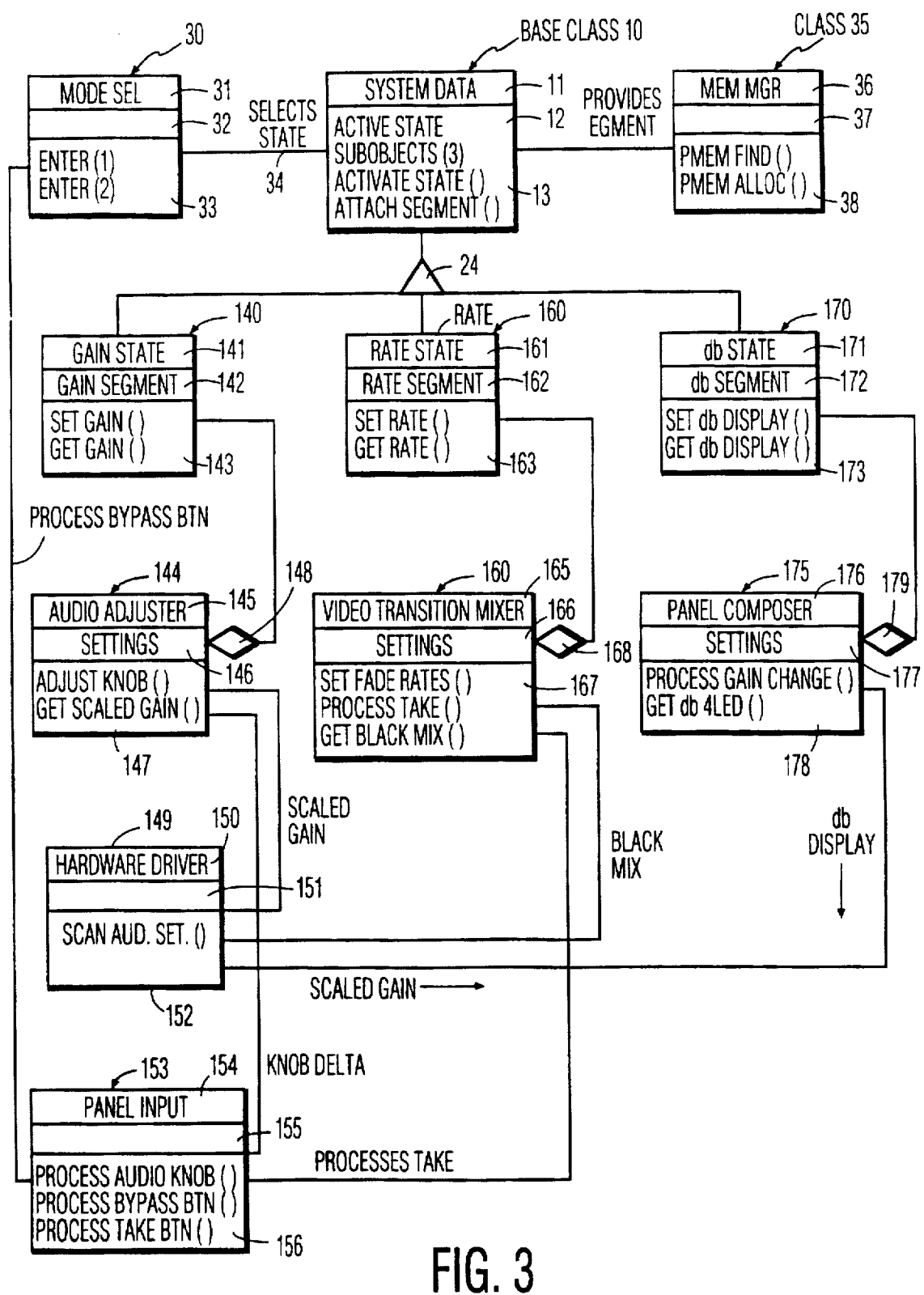
FIG. 3 sets forth a diagram of the application embodiment of FIG. 2 in Rumbaugh notation.

In the generalized example of the present invention shown in FIG. 1, the system provides an object-oriented system useful in providing sharing of persistent, Non-volatile memory between classes within an object-oriented class pattern which provides collective state switching capability. FIGS. 3 and 4 set forth below provide more specific examples of such state switching applications of the present invention. Suffice it to note here, however, the objective of the system of FIG. 1 is to provide the preservation of data encapsulation while providing persistence and the ability to manage state sets through a single interface.

Accordingly, class 30 provides objects which manage the operation of a selection key within the host system to select between two available modes of operation identified as modes 1 and 2. Accordingly, class 30 is identified as mode selector and includes operations for entering mode 1 or entering mode 2. In accordance with the present invention, selection of modes 1 and 2 corresponds to selections between alternative state sets within various system objects. Accordingly, line 34 indicating the relationship between class 30 and base class 10 is identified in accordance with state selection.

Base class 10, named system data, includes attributes for activate state and subobjects. Within operations 13, class 10 includes operations for activate state, copy states, and attach segment. The function of base class 10 is to provide abstracts for the operations of derived class 20 and to provide information hiding of the methods and procedures for accessing system shared memory through class 30. Base class 10 functions for providing data segments as each subclass is instantiated. Each subclass instantiation of the same general identity is bound to the same shared memory area. The base class performs the function of binding the data segment. As needed, the shared memory area is initialized with previously saved data. As data is changed, the contents of the shared memory area are automatically saved. As the data segment is bound, a pointer to the subclass is also registered for state selection control. Selection of a specific state-set is triggered by making a call to a single base class member function. This function iterates through all registered subobjects and triggers the necessary actions required to change state-sets.

Class 20, named state, includes attributes 22 indicated as object type and segment with states. Object 20 also includes operations within operations 23 corresponding to the abstractions for state management, show, copy state and state change action all due to its derived class relationship to base class 10. Operations 23 also includes operations for observation of internal state data and so-called mutators which are capable of changing internal state data. Thus, derived class 20 inherits all operations that base class 20 has. In addition, derived class 20 has access to memory segment provided by base class 10, and implements all operations abstracted within base class 10. In reality, derived class 10 uses operations (attach segment) to gain access to the nonvolatile shared memory of the system.

Class 50 is described as an owner class having a name, class, to indicate general reference to an owner class having internal settings within attributes 52 which are the internal states within the class. As mentioned above, aggregation symbol 54 indicates that derived class 20 is contained within class 50 and is able to mutate or change the internal states of class 20. Operations 53 of class 50 is left blank indicating that virtually any operations may be listed but that none are required in the generalized example of FIG. 1.

Class 60 described as a "non-owner" class has a name, user, and attributes indicated as settings. As with class 50, operations portion 63 of class 60 is left blank indicating virtually any operation may be listed within class 60. Of importance with respect to the relationships to be understood in FIG. 1 is the use of symbol 64 relating class 60 to class 20 indicating option use or containment of class 20 within class 60. Nonowner class 60 is incapable of mutating or changing internal data states of class 20 but are limited to reading them or observing them.

Thus, what is shown is FIG. 1 is a generalized diagram using Rumbaugh notation of a shared-persistent class pattern object-oriented system in which the base class establishes a common structure and abstracts common behavior for each subclass and implements and hides the persistence scheme. The base class also provides an interface to allow control over system-wide state selection. Each subclass collects all data needed by a system object owner into a single data segment and provides both public observers and private mutators for each of the data members within the segment. The object owner is given private access to the elements of the subclass. Private access is characterized by the ability to change data within the internal states and is therefore able to use the members of the subclass through its mutators. All other system objects which use the subclass are forced to use the subclass data members only through read only observers. As a result, the present invention provides operations which would otherwise violate encapsulation in a manner consistent with encapsulation by replacing the internal states of all system objects with another object. This additional object within all system objects is part of an inherited hierarchy which can be controlled by the base class. This allows a base class to control the internal states of objects in the system on a system-wide basis while maintaining encapsulation of the objects. The system power and flexibility is dramatically enhanced in that a single command to the base class provides system-wide state changes without the need to individually command each required object in the system to initiate state switching or other state manipulation. The system also addresses read-concurrency by providing access to the same data object for each instance or occurrence of the class created. Write concurrency issues are managed through built-in mutual exclusion in the implementation.

Figure 2:
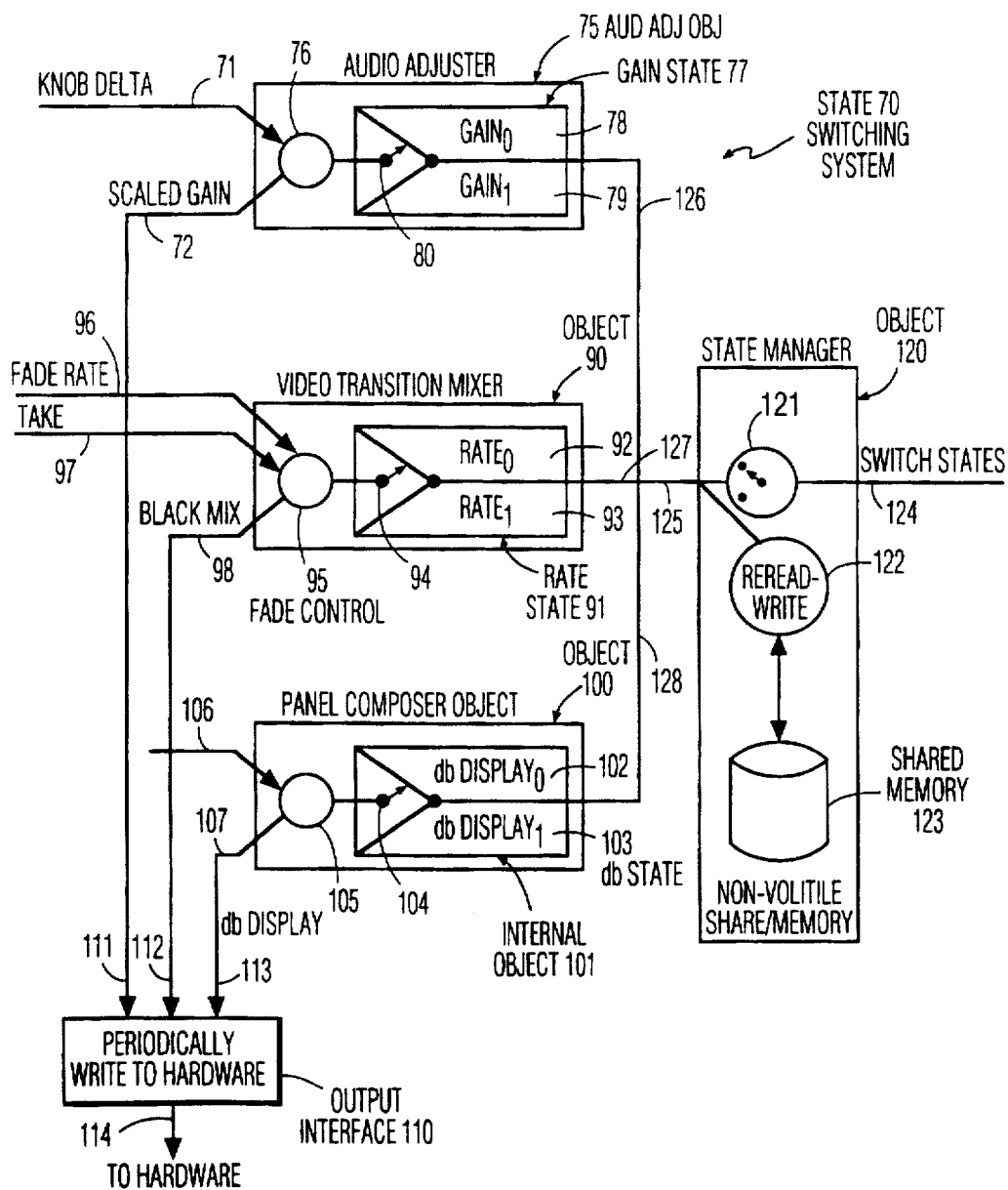
FIG. 2 sets forth a state-switching application embodiment of the present invention.

FIG. 2 sets forth an application embodiment of the present invention object-oriented system which utilizes a shared-persistent class pattern in a typical application of state switching within a broadcast control panel. For purposes of illustration, only three functions are shown operating within the system which comprise audio gain adjustment, video transition mixer, and panel composer. It will be apparent to those skilled in the art, however, that the above-described inventive system is equally applicable to far more complex systems and that three objects that are are shown solely for purposes of illustration.

More specifically, a state switching system generally referenced by numeral 70 includes an audio adjuster object 75 having a gain adjustment 76 coupled to a knob change input 71. Adjuster 76 includes a scaled gain output 72 which is coupled to input 111 of an output interface 110. In accordance with an important aspect of the present invention, audio adjuster object 75 includes an internal object which forms a gain state object 77. Gain state object 77 includes a pair of gain states 78 and 79 together with a switching function 80. Thus, gain state object 77 is able to switch the gain state input applied to adjuster 76 through the operation of switch function 80.

A video transition mixer object 90 includes a fade control 95 coupled to a fade rate input 96, a take input 97 and an output black mix 98 coupled to input 112 of interface 110. In further accordance with the present invention, video transition mixer object 90 includes an internal object comprising rate state object 91 which includes a pair of rate states 92 and 93 selectable through a state selector 94. State selector 94 is coupled to the input of fade control 95. Thus, the rate state for object 95 is selectable through selector 94 between rates 92 and 93.

A panel composer object 100 includes a control 105 having an input 106 coupled to scaled gain output 72 and an output 107 coupled to input 113 of interface 110. In further accordance with the present invention, panel composer object 100 includes an internal object 101 which forms a db state object having db display states 102 and 103 therein. Internal object 101 includes a selector 104 for selecting either of the db states to be applied to control 105.

In further accordance with an important aspect of the present invention, each of the internal objects within objects 75, 90 and 100 are controlled by a state manager class 120. State manager class 120 includes a switch states input 124 and a responding switch selector 120. Object 120 further includes a read/write function 122 coupled to input 125 and to a shared non-volatile memory 123. Non-volatile memory 123 is shared in that the data segments for each of the objects are provided within shared memory 123. Switch function 121 is operative to gang select the internal states within each of objects 77, 91 and 101 to be applied to their respective controls. Thus, selector 121 should be understood to control the selection functions of selectors 80, 94 and 104 within internal objects 77, 91 and 101.

In accordance with the present invention, state manager class 120 responds to a state selection input via input 124 to provide simultaneous selections between gain states 78 and 79 of audio adjuster object 75, rate states 92 and 93 of mixer object 90, and db states 102 and 103 of composer object 100. Thus, state selection is provided without violating the encapsulation of data within the system through the use of internal objects 77, 91 and 101. Because each internal object within the system is controlled through the hierarchy system by state manager class 120, a single selection input to state manager class 120 results in concurrent selection of the gain, rate and db states to be applied to the system through output interface 110. This use of internal objects for the internal states of the audio adjuster video transition mixer and panel composer objects is an important aspect of the present invention system in maintaining encapsulation of the internal states for objects within the system. Because each change applied to a state within internal objects 77, 91 and 101 is communicated to the segment allotted thereto within shared memory through state manager class 120, the persistence of the system within shared memory is provided.

FIG. 3 sets forth a diagram of the system of FIG. 2 in Rumbaugh notation. It will be noted that the system of FIG. 3 includes a base class 10, a mode select class 30 and a memory class 35 substantially the same as classes 10, 30 and 35 seen in FIG. 1. Thus, base class 10, mode select class 30 and memory class 35 should be understood to interrelate substantially in the same manner as described above for FIG. 1. In addition and in further similarity to the generalized system of FIG. 1, it should be noted that base class 10 is related to the remaining classes within the system through a base/derived class symbol 24 in the same manner set forth above in FIG. 1. Thus, the same overall control of the exemplary system shown in FIG. 3 as is provided in the generalized system in FIG. 1 should be understood to continue in the system of FIG. 3. In essence, the derived classes and classes related to base class 10 are more specifically described in FIG. 3 than in the generalized diagram of FIG. 1.

Thus, the system of FIG. 3 includes a gain state class 140, a rate state class 160 and a db state class 170 all related to base class 10 as derived classes of base class 10. Accordingly, it will be recalled that the hierarchy and inheritance relationships found in such a base class to derived class relationship apply to derived classes 140, 160 and 170. Thus, gain state class 140 includes a state name 141, a gain segment attribute 142 and operations portion 143. Similarly, rate state class 160 includes a state name 161, an attribute 162 and operations 163. Finally, db state class 170 includes a state name 171, an attributes portion 172 and an operations portions 173.

An audio adjuster class 144 having a class name 145, an attributes portion 146 and an operations portion 147 is related to gain state class 140 through aggregation symbol 148. Accordingly, it should be understood that audio adjuster class 144 is able to change the data states within gain state class 140. A hardware driver class 149 includes a class name 150, an attributes portion 151 and an operations portion 152. Hardware driver class 149 is related to audio adjuster class 144. Specifically, a scaled gain information relationship is provided between classes 149 and 144.

A video transition mixer class 164 includes a class name 165, an attributes portion 166 and an operations portion 167. Video transition mixer class 164 is related to rate state class 160 through aggregation symbol 168. Thus, it will be noted that video transition mixer class 164 is able to change the internal states of data within class 160. Class 164 is further related to hardware driver class 150. Specifically, black mix information is communicated therebetween.

A panel composer class 175 includes a class name 176, an attributes portion 177 and an operations portion 178. Panel composer class 175 is related to db state class 170 through an aggregation symbol 179. Thus, it should be noted that panel composer class 175 is able to change or alter the internal states of data within db state class 170. Class 175 is further related to class 149 and specifically exchanges information on scaled gain and db display information therewith.

A panel input class 153 includes a panel name 154, an attributes portion 155 and operations portion 156. Panel input class 153 is related to class 144 for the exchange of knob delta information. Class 153 is further related to class 164 for the exchange of process take information and is related to class 30 for the exchange of process bypass information.

The operation of the system shown in FIG. 3 provides the capability of selecting the gain state, rate state and db state of audio adjuster class 144, video transition mixer 164 and panel composer class 175 through the operation of a single mode select class 30. This capability is provided in accordance with an important aspect of the present invention by providing a gain state class 140, within audio adjuster class 144, a rate state class 160 within video transition mixer 164 and a db state class 170 within panel composer class 175. Each of classes 140, 160 and 170 is related to their respective one of classes 144, 164 and 175 through aggregation as shown by symbols 148, 168 and 179. This aggregation depicts the relationship between classes in which the internal states of classes 140, 160 and comprise the internal state of classes 144, 164 and 175, may be changed or altered by classes 144, 164 and 175. It will be recalled by reference to FIG. 2 that internal objects for gain state, rate state and db state are provided within the audio adjuster, video transition mixer and panel composer objects. Thus, in accordance with an important aspect of the present invention, selection between internal states of classes 140, 160 and 170 is facilitated in response to their relationship to base class 10.

In this manner, the encapsulation of internal states for classes 144, 164 and 175 is preserved while the internal state data is available to and controlled by base class 10. It is this hierarchy of class pattern which facilitates the present invention single interface control of a plurality of state selections and maintains the encapsulation of data within system objects.

What has been shown is a shared-persistent object-oriented class pattern which maintains encapsulation of object internal states while providing state switching and persistence through a single interface controller. The system is applicable to a variety of applications in which a plurality of internal state sets are desired to be switched in response to a single panel command or the like.

That which is claimed is:

1. An object-oriented system comprising:

a plurality of classes each having an internal object defining a plurality of internal states and means for switching therebetween;

a base class and a state selection class related to provide a state selection command to the base class; and a derived class related to the base class through a inheritance hierarchy in which the derived class may be controlled by the base class, the base class operative in response to the state selection class to switch the internal states of the internal objects on a system-wide basis in accordance with a shared-persistent object-oriented class pattern.

2. An object-oriented system as set forth in claim 1 wherein the state selection class includes a state manager object, responsive to a state selection input, which includes a shared non-volatile memory for storing data segments for each of the internal objects.

3. An object-oriented system as set forth in claim 2 wherein the plurality of classes includes:

an audio adjuster class;

a video transition class; and a panel composer class.

4. An object-oriented system as set forth in claim 3 wherein the audio adjuster class internal object includes a plurality of audio gain states and the video transition class internal object includes a plurality of rate states and the panel composer class internal object includes a plurality of display scaled gain states.

5. An object-oriented system as set forth in claim 1 wherein the plurality of classes includes:

an audio adjuster class;

a video transition class; and a panel composer class.

6. An object-oriented system as set forth in claim 5 wherein the audio adjuster class internal object includes a plurality of audio gain states and the video transition class internal object includes a plurality of rate states and the panel composer class internal object includes a plurality of display scaled gain states.

7. An object-oriented system as set forth in claim 6 wherein the state selection class includes a state manager object, responsive to a state selection input, which includes a shared non-volatile memory for storing data segments for each of the internal objects.

8. An object-oriented system having a plurality of system objects, each having encapsulated alternative internal states, including means for switching between the alternative internal states without violating the encapsulation thereof, the object-oriented system comprising:

a plurality of internal objects within the plurality of system objects each defining the alternative internal states; and a base class object related to each of the internal objects by an inheritance hierarchy in which selection of the internal objects within each of the system objects is controlled by the base class.

9. The object-oriented system as set forth in claim 8 further including a system manager object for receiving user inputs and controlling the base class object to provide system-wide state changes of the internal objects in response to a single user input.

10. An object-oriented system as set forth in claim 9 wherein the plurality of system objects includes:

an audio adjuster object;

a video transition object; and a panel composer object.

11. An object-oriented system as set forth in claim 10 wherein the audio adjuster object internal object includes a plurality of audio gain states and the video transition object internal object includes a plurality of rate states and the panel composer object internal object includes a plurality of display scaled gain states.

12. An object-oriented system for providing preservation of data encapsulation while providing persistence and the ability to manage state sets through a common interface, the object-oriented system comprising:

a derived class forming a subclass of the base class having system objects each of which includes an internal object encapsulating alternative internal state sets of the system objects, the internal objects being part of an inherited hierarchy;

a base class for establishing a common structure and abstracting a common behavior for each of the derived classes and for controlling the inherited hierarchy;

a mode select class for selecting between the alternative internal state sets using the internal objects; and a memory class having a non-volatile shared memory object which includes allocated memory locations for each internal object.

* * * * *